March 4, 1958 A. R. SMITH 2,825,311
WASTE-HEAT BOILER

Filed May 9, 1955 2 Sheets-Sheet 1

INVENTOR.
ALFRED R. SMITH
BY
Donald G. Dalton
HIS ATTORNEY

March 4, 1958  A. R. SMITH  2,825,311
WASTE-HEAT BOILER

Filed May 9, 1955  2 Sheets-Sheet 2

INVENTOR.
ALFRED R. SMITH
BY
Donald G. Walton
HIS ATTORNEY

United States Patent Office 2,825,311
Patented Mar. 4, 1958

2,825,311

WASTE-HEAT BOILER

Alfred R. Smith, Forest Hills, N. Y., assignor to Universal Atlas Cement Company, a corporation of Indiana Application May 9, 1955, Serial No. 506,961

1 Claim. (Cl. 122—7)

The present invention relates to boilers or steam generators for use in the cement industry, or a similar industry, where service conditions require that fuel be burned to supplement the high temperature waste gases, as from cement kilns, for generating a sufficient amount of steam to produce the power required by the cement plant.

It is usual to find in cement plants equipped to utilize the waste heat in the gases from cement kilns by generating steam therefrom that such heat is insufficient to generate all of the power needed to carry out the other steps in the cement making process. The greater portion of the power required stems from grinding operations on raw materials prior to treatment in rotary kilns and further grinding operations to prepare finished cement from the clinkered material produced by the kilns. The power deficiency may be supplied either by purchase from outside sources or it may be generated within the plant. If the latter course is chosen, it is usual to provide an auxiliary boiler unit or units with suitable fuel burning equipment to utilize the most economical fuel available in the district in question. Fuels employed cover the range of use customarily found in industry including coal, oil and the various fuel gases.

The bulk of the steam generated in cement plants of the type referred to is provided by heat derived from kiln gases. Interruptions to kiln operation reduce the steam output from the waste heat boilers so that the separately fired auxiliary boilers are at times called upon to produce at a greater rate than the usual power deficiency would indicate. Such interruptions often occur with scant advance warning. Separately fired units are frequently carried on a hot bank merely to guard against sudden interruptions in plant operation if kiln outage takes place. The carrying of banked fires is wasteful of fuel and requires constant attention on the part of the boiler room operators.

Unsuccessful attempts have been made to merge the products of combustion of a fuel with the waste gases derived from the kilns in order to boost output of steam. Such attempts have met with little success since the efficient burning of fuel indicates the use of a minimum amount of air in excess of that required for complete combustion of the fuel. Minimum air results in maximum gas temperature. The gases from the kilns are heavily laden with dust, up to twelve or even more grains per cubic foot of gas. When the combustion gases are intermingled with the kiln gases, the dust tends to fuse and adhere to boiler tube surfaces thereby blocking the gas passages in the boiler and reducing heat absorbing capacity.

One of the principal objects of this invention is to provide a waste heat boiler for utilizing the heat of dust laden industrial waste gases with a fuel burning unit for supplying additional heat including provisions for reducing the temperature of its products of combustion to thereby prevent heating of the dust in the waste gases passing through the waste heat boiler to a temperature at which it will adhere to the surfaces of the waste heat boiler. In a manner to be described, temperature reduction of the products of combustion from the fuel burning unit is effected by boiler tubes which are preferably incorporated as a part of the boiler system of the waste heat boiler.

Another object of the invention is to provide, in combination with a waste heat boiler, an auxiliary fuel fired boiler for developing additional power and for supplying heated products of combustion to the waste heat boiler after sufficient heat has been extracted from such products of combustion to prevent heating of dust in waste gases being fed to the waste heat boiler to a surface adhering temperature. In a manner to be described, the waste heat boiler and fuel fired boiler may be operated simultaneously or independently of each other and with similar steam generating characteristics irrespective of their manner of operation.

A further object of the invention is to provide an improved boiler unit which can be operated with waste heat, when it is available, or on the heat from the combustion of fuel, or simultaneously on both.

A still further object is to provide a waste heat boiler unit with a separately fired boiler section which is at full operating pressure and temperature even though no fuel is being fired in that section, thereby enabling rapid generation of steam when the burning of fuel is initiated in the furnace of said section.

A still further object is to provide an improved boiler unit with auxiliary fuel firing which will enable the generation of steam from heavily dust laden waste gases with minimum difficulty from lodgment of such dust on the heating surfaces of the boiler.

A still further object is to prevent fusion of the dust in the waste gases by their commingling with the high temperature gases from the efficient combustion of fuel in the separately fired furnace section.

Other objects of the invention will appear in the specification and will be apparent from the accompanying drawings in which.

Figure 1:
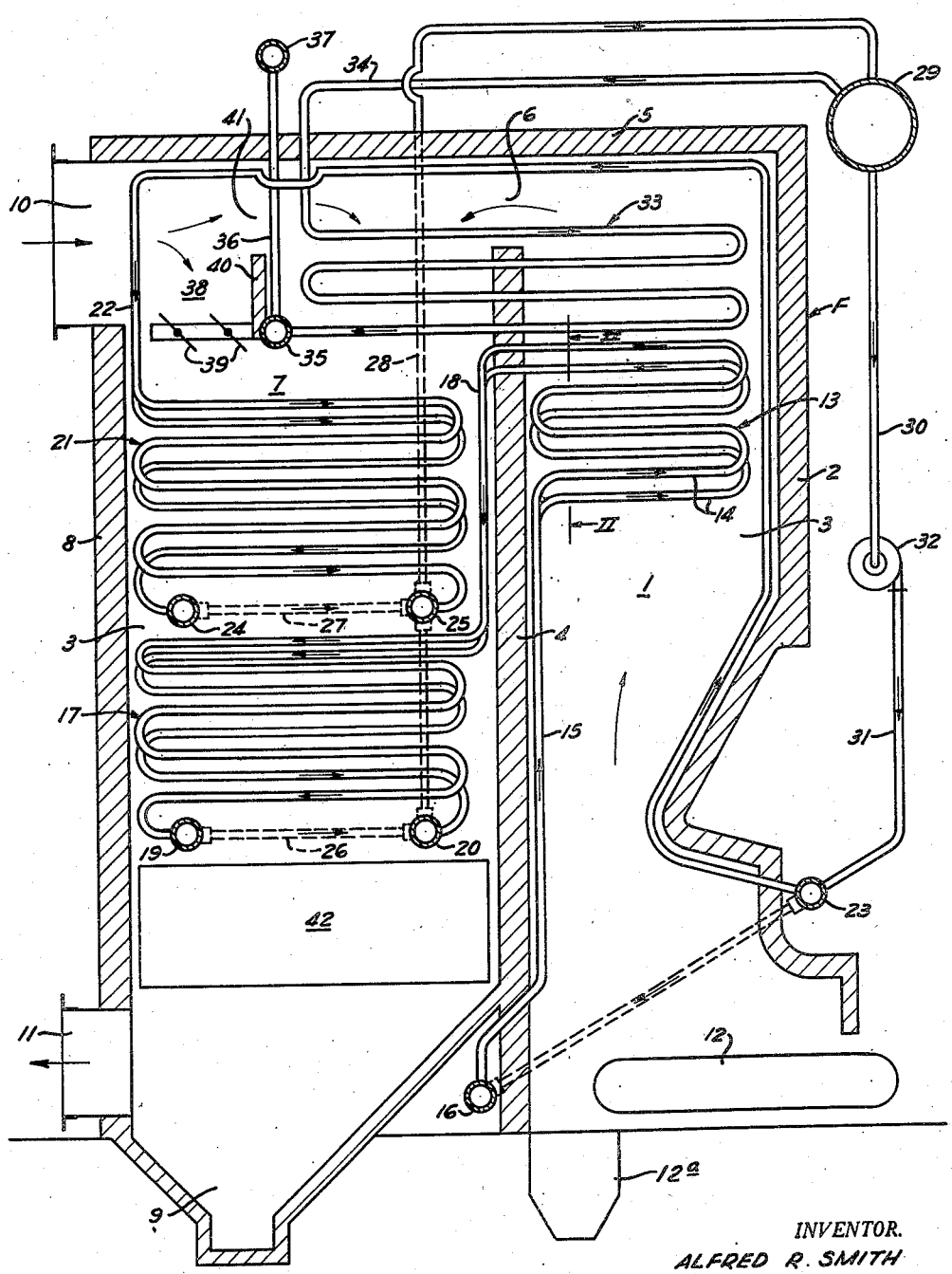
Figure 1 is a vertical sectional view of the improved boiler unit showing in side elevation the arrangement of steam generating surfaces, a means for collection and disposal of dust and fly ash as well as a means for causing water and mixtures of water and steam to circulate through the steam generating surfaces.

The steam generating unit of this invention, referring to the drawings, comprises a furnace, designated as a whole by the letter F, having a furnace or heating chamber 1 enclosed by front wall 2, side walls 3, only one of which is shown, rear wall 4 and roof 5, the rear wall 4 having an opening 6 at its upper end providing an offtake for heating gases therein. The furnace F further has a second heating chamber or pass 7 enclosed by the wall 4, side walls 3, only one of which is shown, a back wall 8 and the roof 5. The furnace wall 4 in effect partitions the interior of the furnace F into the two heating chambers 1 and 7 which extend vertically as shown in the drawings. A hopper 9 forms the bottom of the pass 7. The back wall 8 has openings at its top and bottom providing respectively a waste gas inlet 10 and a flue gas outlet 11. Fuel burning means, such as a traveling grate stoker 12 or other suitable type of fuel burner, is located at the bottom of furnace chamber 1, an ash-pit being indicated at 12a.

Figure 2:
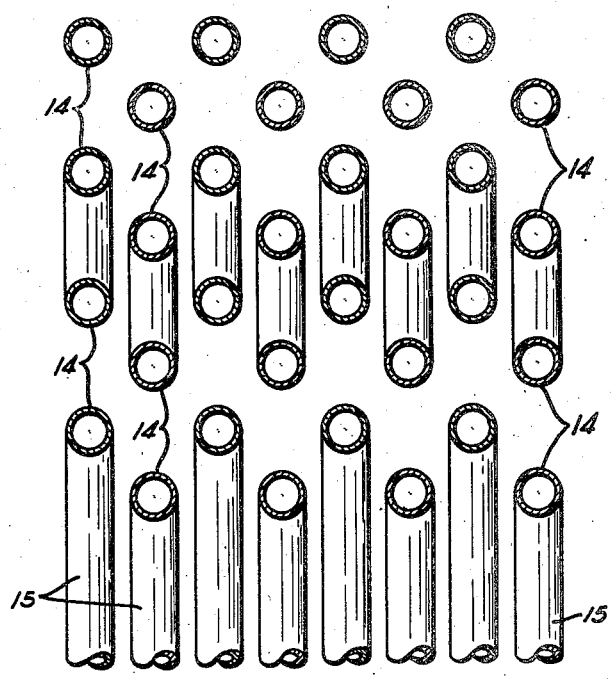
Figure 2 is a typical fragmentary cross section of the heat absorbing tube bundles taken on line II—II of Figure 1, showing the connection of water wall tubes into the tube bundles.

The upper portion of the furnace chamber 1 is provided with a bundle 13 of steam generating tube coils 14, each of which, as shown in Figure 2, is comprised of parallel and vertically spaced rows of tubes arranged transversely of the gas flow from the furnace which are connected at their ends by return bends for serial flow of fluid therethrough, the rows of tubes of alternate coils being staggered in relation to the row of tubes of adjacent coils. The lower end of each coil 14 is connected to a tube 15 which extends down the face of the rear wall 4 to a header 16 located outside of the rear wall 4. Header 16 serves as the water supply for all of the rear wall tubes 15 and the respective tubes 14 connected therewith.

A bundle 17 of steam generating tube coils is located within the lower portion of the pass 7. The coils in the bundle 17 have a number and a configuration similar to the coils 14 of the bundle 13 as shown in Figure 2, each coil of the bundle 17 comprising parallel and vertically spaced rows of tubes arranged transversely of the gas flow and connected at their ends by return bends for serial flow of fluid therethrough, the rows of tubes of alternate coils being staggered in relation to the rows of tubes of adjacent coils. The upper end of each coil of the bundle 17 is connected to a tube 18 which extends upwardly along the face of the rear wall 4, thence passes through the rear wall and connects to the upper end of one of the coils 14 of the tube bundle 13. Because the tube bundles 13 and 17 have the same number of parallel coils, each coil of the tube bundle 13 is connected via a wall tube 18 to a respective coil of the tube bundle 17. The connections of the wall tubes 18 to the coils of the bundle 17 are similar to the connections of the wall tubes 15 to coils 14, as typically shown in Figure 2. The lower ends of alternate coils of the tube bundle 17 are connected into outlet headers 19 and 20.

Another bundle 21 of steam generating tube coils is located within the upper portion of the pass 7. The coils in the bundle 21 have a number and a configuration similar to the coils 14 of the bundle 13, as shown in Figure 2, each coil comprising parallel and vertically spaced rows of tubes arranged transversely of the gas flow and connected at their ends by return bends for serial flow of fluid therethrough, the rows of tubes of alternate coils being staggered in relation to the rows of tubes of adjacent coils. The upper end of each coil in the bundle 21 is connected to a tube 22 which extends upwardly toward the roof 5 thence passes along the roof to the front wall 2, thence down the front wall and through the wall to supply header 23. Header 23 serves as a water supply for all of the wall tubes 22 and their respective tube coils of bundle 21. The lower ends of alternate coils of tube bundle 21 are connected into outlet headers 24 and 25.

Outlet headers 19, 20, 24 and 25 are connected by pipes 26, 27 and 28, designated diagrammatically by broken lines, into the steam space of a steam and water separating drum 29. The inlet headers 16 and 23 are connected by pipes 30 and 31 to the water space of the steam and water separating drum 29. A water circulation pump 32 is connected between pipes 30 and 31 to cause a forced circulation of the water from the drum 29 through headers 16 and 23 into the three tube bundles 13, 17 and 21. The steam evaporated in the tube bundles together with the unevaporated water flows through pipes 26, 27 and 28 and is discharged into the drum 29.

A superheater in the form of a bundle 33 of superheater coils extends through the upper portions of both the furnace 1 and the pass 7, each coil comprising parallel and vertically spaced rows of tubes connected at their ends by return bends for serial flow of steam therethrough. The upper end of each superheater coil in the bundle 33 connects via a tube 34 into the steam space of the steam and water separating drum 29 for supply of steam to the superheater. The lower end of each superheater coil in the bundle 33 connects into an outlet header 35 which in turn is connected by tubes 36 to the outlet steam main 37. The outlet header 35 and superheater 33 are spaced from back wall 8 to form an opening 38 therebetween through which a portion of the waste gas from inlet 10 or a portion of the products of combustion from furnace 1 may flow downwardly through the tube bundles 21 and 17. Dampers 39 are provided in opening 38 to control the flow of waste gas therethrough.

A baffle 40 extends upwardly from superheater header 35 and is spaced from room 5 to form an opening 41 therebetween through which the remaining portion of waste gas from inlet 10 or a portion of the products of combustion from furnace 1 may flow and thence pass downwardly over the rear portion of the superheater 33 and the tube bundles 21 and 17.

Optionally a conventional economizer tube bank 42, designated diagrammatically, may be added in pass 7 to abstract additional heat from the gases flowing therethrough and absorb it in the feed water being delivered to the boiler.

Figure 3:
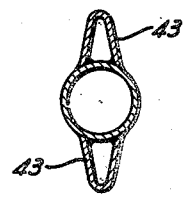
Figure 3 is an enlarged cross sectional view of an extended surface applied to the tubes of the three tube bundles in the saturated steam circuits.

Preferably the tubes of bundles 21 and 17, and of the economizer bank 42 if present, are provided with extended surfaces or fins 43 as shown in cross section in Figure 3. The fins 43 extend vertically and prevent accumulation of dust on the tubes in addition to providing an increased heat transfer area.

In normal operation, hot waste gases as from a cement kiln in the range of temperature of from 1200° F. to 1600° F. enter pass 7 through inlet 10, a portion passing downwardly through opening 38, the remaining portion passing over baffle 40 through opening 41 into the space over the rear portion of superheater 33. The relative amounts of each of the portions of waste gas is determined by the throttling effect of dampers 39 on the gas flow through opening 38.

When waste gases are not available, the products of combustion from the burning of fuel on the stoker 12 rise through furnace 1, pass through tube bundle 13 and the forward portion of superheater 33, thence flow rearwardly through offtake 6 into the top of pass 7 where a portion may be bypassed in its downward flow around the rearward portion of superheater 33 via opening 38. The damper 39 controls the amount of the products so bypassed.

When waste gas is used and supplemented by fuel, the products of combustion rising in furnace 1 from the burning of fuel on stoker 12, pass through tube bundle 13 and superheater 33 and then through offtake 6 and above the rear portion of superheater to join the portion of the waste gases entering through opening 41. The combined products of combustion and waste gas portion then pass downwardly over the rear portion of the superheater. Below the superheater, both portions of the waste gases and the products combine to flow downwardly over tube bundles 21 and 17 and through the economizer bank 42, if present, to the flue gas outlet 11.

Waste gases from cement kilns, delivered to the pass 7 through the inlet opening 10, are heavily laden with dust, generally in the nature of 12 or more grains per cubic foot, and usually have a temperature in the range of 1200° F. to 1600° F. To prevent heating of the dust to a temperature at which it will adhere and possibly fuse to the surfaces of the tube bundles 17 and 21, the products of combustion from the fuel burner or grate 12 are cooled by passing over the bundle 13 and the portion of the superheater bundle 33 in the chamber 1. Preferably the portion of the superheater bundle 33 and the bundle 13 in the chamber 1 have a heat transfer or heat absorbing surface such that the products of combustion from the grate 12 are cooled to a temperature not exceeding that of the waste gases before being intermingled therewith in pass 7. In this manner, heating of the dust in the waste gases to a fusing temperature or to a temperature promoting adherence to the boiler tubes in the pass 7 is effectively prevented. This eliminates excessive accumulations of dust on the boiler tubes which would otherwise be effective to reduce their heat absorbing capacity and might block the gas passages between tubes.

The use of extended surfaces 43 on the tubes as shown in Figure 3 has the advantage of reducing the dust which will collect thereon as well as reducing the draft loss incurred by the gases flowing over the tubes and increasing the heating surface of the tubes and thereby the heat absorption for a unit length of tube. Preferably the tubes are made of relatively small diameter since less dust will collect on tubes of small diameter per unit of heat absorbing surface and per unit of net heat absorbed than will collect on tubes of larger diameter.

The use of a pump 32 to circulate water through the tube bundles 13, 17 and 21, which comprise the steam generating surfaces, makes it possible to maintain all pressure parts at operating temperature and pressure without the necessity of flow of hot gases over all of the surfaces to induce natural circulation. Thus the entire unit remains heated and in a condition to assume load promptly either from the heat in the waste gases or heat derived from the furnace, whichever one may be in service. Forced circulation also makes possible the location of the heating surface of tube bundle 13 between the furnace and the point of juncture of the waste gases and the furnace gases to reduce the temperature of the latter so that the mixture will be below the fusion point of dusts contained in the former.

Tubes of small diameter arranged horizontally and at right angles to the flow of gases result in higher rates of heat transmitted and hence steam generated both per unit of space occupied and per unit of material used than is the case with larger tubes with gas flowing along the tubes. However, small tubes have a higher hydraulic resistance than larger tubes so that to obtain adequate water flow to protect the metal of which they are composed, a pump is found to be necessary.

The present practice in the cement industry is to locate kilns about 30 feet above the ground. The compact design made possible by the use of small tubes enables an adequate amount of surface for feed-water heating and steam generation to be located in a single downward pass within the space limitation indicated above. As a result, a single dust-hopper 9 may be used located at a point beyond all heat-absorbing surfaces.

The single downward pass 7 with a single dust hopper 9 provides a desirable feature from the standpont of air loss as compared to conventional waste heat boilers. Waste heat boilers customarily used provide either separate passes over the boiler surface each with a dust hopper beneath or use a single pass of such length that several hoppers are needed if the side slopes of the hoppers are to be adequate for flow of dust and the depth and cost of the hoppers is to be reasonable. It is highly desirable to reduce the number of hoppers to a minimum since each allows the inward leakage of air degrading the temperature of the gases passing over the heat absorbing surface, increasing the volume of gas to be handled by draft making equipment and increasing the draft loss through the boiler. These disadvantages are avoided by the furnace of this invention through the provision of the single hopper 9 which is so located that leakage can take place only at a point beyond all heating surfaces.

From the foregoing, it will be apparent that the waste heat boiler of this invention provides for the generation of steam from waste heat gases and for auxiliary power from a fuel burner when the waste heat is inadequate or interrupted. Attention is particularly directed to the fact that the provision of the tube bundle 13 in the chamber or pass 1 enables intermingling of the products of combustion from the fuel burner 12 in the chamber or pass 7 without heating of the dust in the waste gases to a temperature such that it will adhere or fuse on the surface of the heating tubes in the pass 7. By providing for a reduction in the temperature of the products of combustion from the fuel burner 12 to a temperature approximating that of the waste gases, the furace can be operated using both waste gases and fuel burner products of combustion, and on waste gas or products of combustion alone. Attention is also directed to the fact that the heating passes 1 and 7 provide a continuous furnace heating chamber having a fuel burner 12 at one end from which products of combustion have an uninterrupted flow to the flue outlet 11 at the other end, and that the waste gas inlet 10 is located intermediate such ends. By locating the waste gas inlet 10 at a position intermediate the fuel burner 12 and outlet 11, the products of combustion from the fuel burner 12 have their temperature reduced by the heating tube bundle 13 prior to intermingling with the waste gases entering the inlet 10. If the heat from the waste gases entering the inlet 10 to the waste heat boiler pass 7 is adequate for power generation purposes, then no heat need be supplied by the fuel burner 12 and boiler pass 1 which in effect provide an auxiliary fired boiler for supplementing the power produced by the boiler pass 7 when needed or for producing all of the power in the event of kiln outage and interruption of the supply of waste heat gases to the inlet 10. In addition, the arrangement of the heating tubes in the two furnace passes 1 and 7 and particularly the arrangement of the superheater 33 with portions thereof in each of the passes 1 and 7 provide identical steam generation characteristics for furnace operation jointly on waste gases and products of combustion from the fuel burner 12 and for furnace operation on the waste gases or such products of combustion as the sole source of heat.

While I have shown and described the preferred embodiment of my invention, it will be apparent that other adaptations and modifications may be made without departing from the scope of the following claim.

I claim:

In a steam generating unit, a furnace having a partition wall separating it into two vertically extending heating chambers, one of said chambers having an inlet for dust-laden waste gases at the top thereof and a flue outlet at the bottom thereof, the other of said chambers having a fuel burner at the bottom thereof for producing products of combustion, said partition wall having an off-take opening at its upper end through which said products flow for movement through said one chamber to said outlet, a boiler system comprising a first group of heating tubes in said other chamber, a second group of heating tubes in said one chamber, and a group of superheater tubes below said off-take and extending transversely of said partition wall with portions thereof in each of said chambers above said first and second groups, said one chamber having a baffle wall and damper adjacent said waste gas inlet for deflecting part of the waste gas admitted over the portion of the superheater tubes in said one chamber.

References Cited in the file of this patent

UNITED STATES PATENTS

| | | |
|---|---|---|
| 1,961,222 | Jacobus | June 5, 1934 |
| 2,170,345 | Bailey et al. | Aug. 22, 1939 |
| 2,336,833 | Badenhausen | Dec. 14, 1943 |